US005595012A
UScoreboard
United States Patent [19]
Coleman

[11] Patent Number: 5,595,012
[45] Date of Patent: Jan. 21, 1997

[54] BIRD DECOY

[76] Inventor: Allen D. Coleman, 712 3rd St., League City, Tex. 77573

[21] Appl. No.: 424,792

[22] Filed: Apr. 18, 1995

[51] Int. Cl.⁶ ................................. A01M 31/06
[52] U.S. Cl. ......................................... 43/3
[58] Field of Search ............................... 43/2, 3

[56] References Cited

U.S. PATENT DOCUMENTS

| | | | |
|---|---|---|---|
| 156,239 | 10/1874 | Strater | 43/3 |
| D. 185,866 | 8/1959 | Anderson | 43/3 |
| 547,032 | 10/1895 | Ross | 43/3 |
| 639,261 | 12/1899 | Merrill | 43/3 |
| 812,499 | 2/1906 | Johnston | 43/3 |
| 833,966 | 10/1906 | Johnston | 43/3 |
| 957,750 | 5/1910 | Cunningham | 43/3 |
| 1,066,587 | 7/1913 | Cunningham | 43/3 |
| 1,598,619 | 9/1926 | Reynolds | 43/3 |
| 2,755,588 | 7/1956 | Johnson | 43/3 |
| 2,799,961 | 7/1957 | Jaumotte | 43/3 |
| 2,812,608 | 11/1957 | Jones | 43/3 |
| 4,062,141 | 12/1977 | Shjeflo | 43/3 |
| 4,172,335 | 10/1979 | Farmer | 43/3 |
| 4,318,240 | 3/1982 | Hillesland | 43/3 |
| 4,334,643 | 6/1982 | Farmer | 43/3 |
| 4,611,421 | 9/1986 | Jacob | 43/3 |
| 4,651,457 | 3/1987 | Nelson | 43/3 |
| 4,689,913 | 9/1987 | Brice | 43/3 |
| 4,753,028 | 6/1988 | Farmer | 43/3 |
| 4,928,418 | 5/1990 | Stelly | 43/3 |
| 4,972,620 | 11/1990 | Boler | 43/3 |
| 5,136,800 | 8/1992 | Lanius | 43/3 |
| 5,172,506 | 12/1992 | Tiley | 43/3 |

OTHER PUBLICATIONS

Gander Mountain, Inc., Gander Mountain Fall 1994 Catalog, p. 172.

Northern Herter's Northern Herter's The Waterfowling & Outdoor Specialists Catalog No. 409, Fall 1994, p. 10, "Wind Sock Goose Decoys".

Primary Examiner—Kurt Rowan
Attorney, Agent, or Firm—Pravel, Hewitt, Kimball & Krieger

[57] ABSTRACT

A bird decoy used to attract waterfowl, such as ducks and geese. The decoy comprises a frame that represents a three-dimensional outline of the head, neck and body of a waterfowl. The frame is constructed of a semi-flexible material which will maintain a certain shape. An air-tight, light-weight, flexible covering is disposed about the outside of the frame to represent an entire three-dimensional shape of a waterfowl. The constructed decoy is open on its bottom side so that a plurality of decoys may be stacked compactly, one upon the other, in their assembled form. The decoy may be supported above the ground by a stake, for the purpose of allowing the decoy to move in a life-like manner when affected by the wind. Alternatively, the decoy may include the same neck and head frame with two stakes protruding downward from the rear of the neck and a windsock-type body portion of flexible material extending from the rear of the neck. The flexible material is also disposed about the outside of the head and neck frame to represent the entire shape of a waterfowl. This decoy is also compactly stackable without assembly or disassembly.

20 Claims, 3 Drawing Sheets

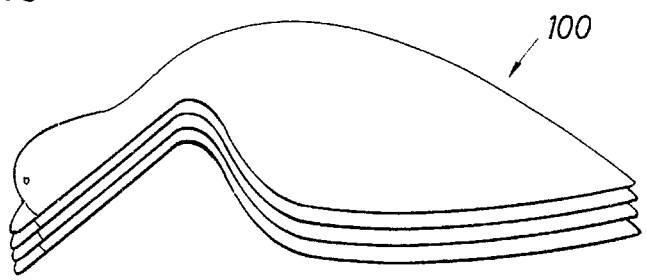
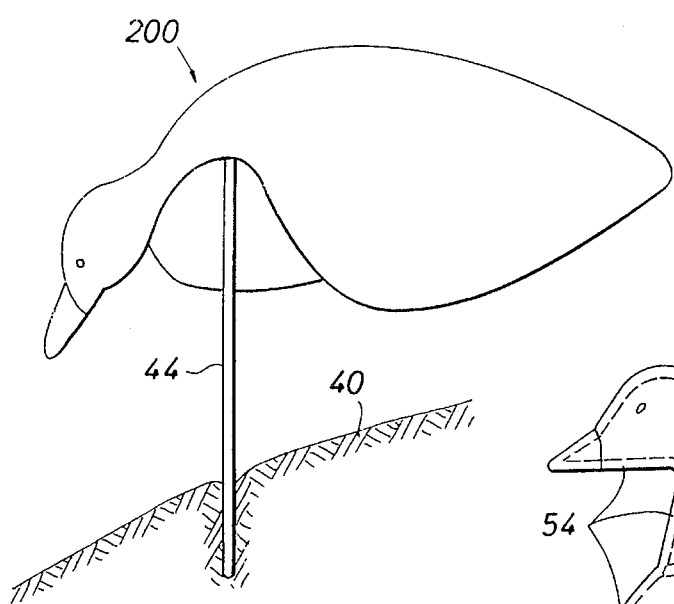
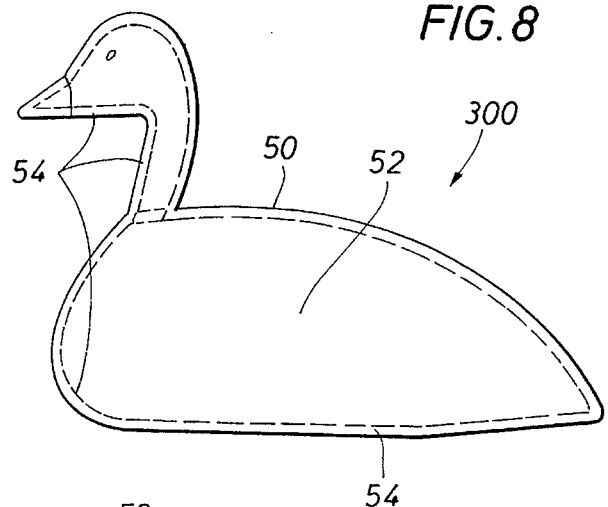
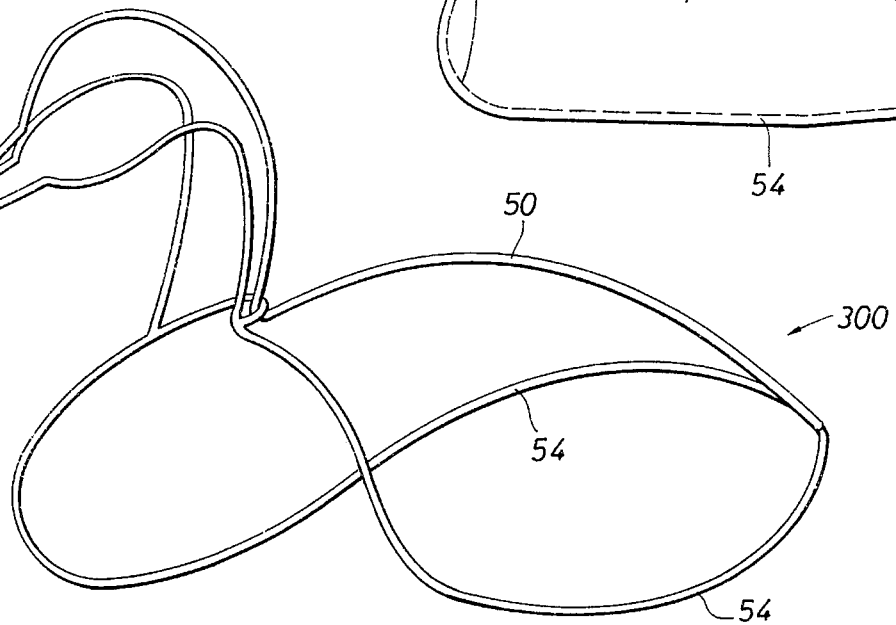

BIRD DECOY

FIELD OF THE INVENTION

This invention is directed to decoys that are used for the purpose of attracting wild game birds. Specifically, the present invention is directed toward decoys used for attracting wild geese and ducks. The present invention relates directly to such decoys that use support frames and flexible coverings, and in another aspect, to windsock-type bodies.

BACKGROUND OF THE INVENTION

For many years decoys have been used to attract wild birds such as ducks and geese. It is known in the prior art to provide decoys using support frames and flexible coverings to mimic the shape of a wild game bird such as a goose. Some examples of such decoys known in the prior art follows.

U.S. Pat. No. 2,812,608 to Jones teaches a collapsible support frame with a flexible covering. The head and neck of this decoy is flat and two-dimensional. This is seen to be unrealistic when viewed by geese approaching from various angles. This decoy is meant to be collapsed before and after use, which is undesirable to the user because of the extra time involved in setting out and picking up the decoy spread.

U.S. Pat. No. 4,689,913 to Brice teaches a collapsible frame with a flexible covering. This decoy also has a flat, two-dimensional head and neck. This decoy is also meant to be collapsed before and after each use. These characteristics are undesirable for the aforementioned reasons.

It is also known in the prior art to provide wild game bird decoys that utilize a head and neck portion and an inflatable body portion of windsock construction to mimic the shape of a goose or duck. Following are some examples of such decoys known in the prior art.

U.S. Pat. No. 4,753,028 to Farmer teaches a decoy comprising a flat, two-dimensional head, neck and stake unit in combination with an inflatable body unit of windsock construction. Experience with use of this decoy shows that the decoy does not stack together well without the body unit being disassembled from the stake unit. Furthermore, the flat, two-dimensional head and neck of the decoy is undesirable because of its unrealistic appearance when geese or ducks approach from various angles.

U.S. Pat. No. 4,062,141 to Shjeflo teaches a decoy with a three-dimensional head and neck unit, a stake unit and an inflatable body unit of windsock construction. Experience with this decoy shows that, although the three-dimensional head and neck does appear more realistic to wild birds, there is no significant movement of the head and neck when the decoy is in use. Additionally, the decoy is not stackable nor easily stored without disassembly.

It is desirable to have a bird decoy having a three-dimensional head and neck which is fully assembled to a stackable, three-dimensional body. It is also desirable that the bird decoy be lightweight and have some movement resulting from slight wind. It is desirable that the head and neck portion move from slight wind to provide a realistic look to the wild birds. It is also desirable that the bird decoys be stackable and easily stored without disassembly of the decoys.

SUMMARY OF THE INVENTION

The present invention is primarily directed toward decoys that are used to attract geese, but may be adapted to attract other wild birds as well. According to one embodiment of the present invention, a decoy has a frame constructed of a material, such as metal wire or a plastic rod, which maintains a certain shape. The frame is meant to represent a three-dimensional outline of the head, neck and body of a goose. The frame may represent an outline of a goose that is in either an alert or feeding position. A light-weight, air-tight material such as plastic or cloth, is disposed about the outside of the frame to mimic the entire shape of a goose. The bottom of the decoy is open so that a plurality of decoys may be compactly stacked one upon the other without disassembly, while retaining their three-dimensional shape. The decoys being stacked in this manner allows for the user to place many decoys in a field in a minimum amount of time. In this embodiment of the present invention, the decoy is suitable for use in light to moderate winds without any means of staking the decoy to the ground being necessary.

Alternatively, the decoy may be used with a stake for the purpose of supporting the decoy entirely above the ground so that wind may cause the decoy to move in a manner in which it simulates the feeding and walking actions of a goose. The stake is constructed of the same wire or rod as the decoy frame is constructed. The flexibility of the stake adds to the movement of the decoy.

In another embodiment of the present invention, a decoy has a three-dimensional head and neck frame, as previously described, with two wire stake members. The wire stake members protrude downwardly from the frame at the end of the neck. This construction allows for a plurality of decoys to be stacked in the manner previously described. A light-weight, air-tight material such as plastic or cloth is disposed about the outside of the frame with a portion of the material extending from the rear of the neck. The portion extending from the neck is shaped as a windsock that is meant to become the body of the decoy. The body portion is then attached to the stake members for the purpose of maintaining an opening in the body portion in an open condition to allow wind to enter the body portion. When the body portion is inflated by wind, the entire decoy is set into motion. The flexibility of the stake members allows for the head and neck to move in a manner which simulates the feeding or walking actions of a goose. The stackability of this decoy allows the user to set a large number of decoys in the field in a minimal amount of time.

It is an object of the present invention to provide new, unique, useful and effective decoys.

Another object of the present invention is the provision of a decoy that has a wire frame and flexible covering simulating a three-dimensional shape of the head, neck and body of a wild game bird.

Yet another object of the present invention is the provision of such decoys that are stackable in their assembled form.

An additional object of the present invention is the provision of such decoys that may be supported entirely above the ground by a stake. This allows the decoy to move, in a manner which simulates a goose feeding or walking, when the decoy is affected by wind.

A further object of the present invention is the provision of such windsock-type decoys that may be compactly stacked together in their assembled form.

Yet another object of the present invention is the provision of such windsock type decoys that achieve a realistic feeding or walking action when the decoy is inflated and put into motion by wind.

BRIEF DESCRIPTION OF THE DRAWINGS

The above and other embodiments of the present invention may be more fully understood from the following detailed description, when taken together with the accompanying drawings wherein similar reference characters refer to similar elements throughout, and in which:

FIG. 5 shows a plurality of bird decoys according to the first embodiment of the present invention compactly stacked together in their assembled form;

FIG. 6 shows a bird decoy according to a second embodiment of the present invention supported by a stake above the ground for the purpose of allowing wind to cause the bird decoy to move in a realistic manner;

FIG. 7 is a perspective view of a bird decoy frame according to a third embodiment of the present invention showing the bird decoy in a sentinel or guard position;

FIG. 8 is a side elevational view of the assembled bird decoy of FIG. 7 with the frame shown in dashed lines;

DESCRIPTION OF THE PREFERRED EMBODIMENTS

Figure 1:
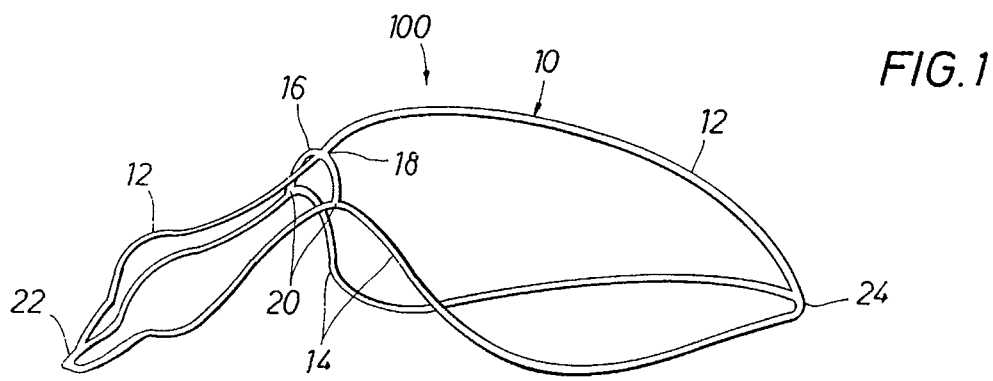
FIG. 1 is a perspective view of a bird decoy frame according to a first embodiment of the present invention showing the bird decoy in a feeding position.

Referring now to the drawings, the first, second, third and fourth embodiments of the bird decoy, generally designated as 100, 200, 300 and 400, respectively, will be described in detail.

Figure 2:
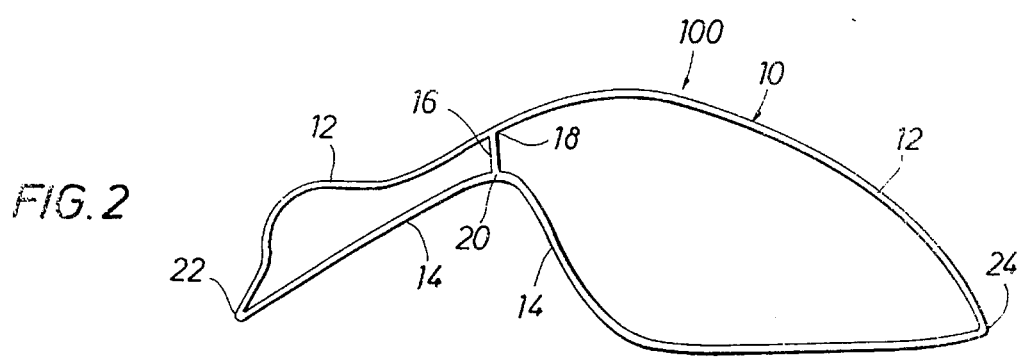
FIG. 2 is a side elevational view of the bird decoy frame of FIG. 1.
Figure 3:
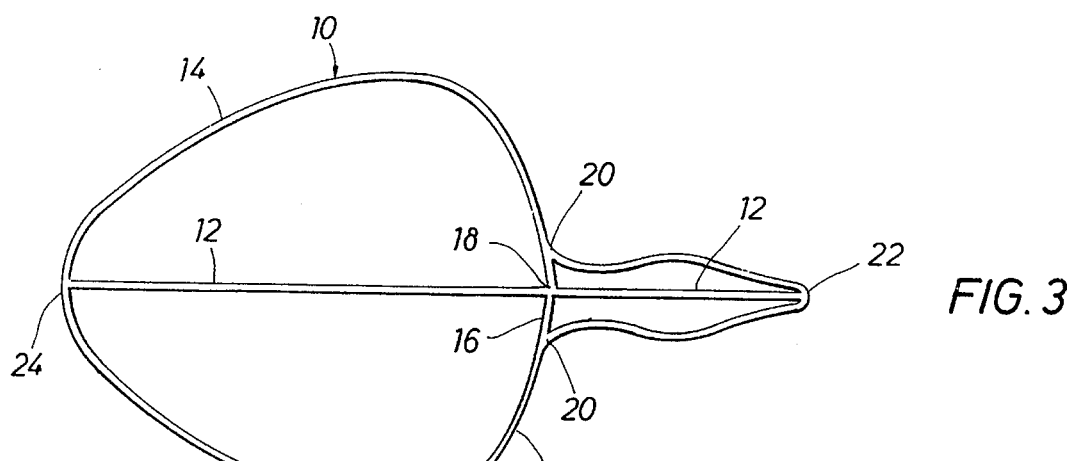
FIG. 3 is a top view of the bird decoy frame of FIG. 1.

Referring to FIGS. 1–3, a frame 10 of the bird decoy 100 according to the first embodiment is shown from different views. The bird decoy 100 shows the bird in a feeding position. FIGS. 1–3 illustrate the three-dimensional construction of the frame 10 by showing the vertical outline frame member 12, the horizontal outline frame member 14 and the inverted U-shaped stabilizer frame member 16. As shown in FIG. 2, the horizontal outline frame member 14 becomes the bottom portion of the shape of the bird, such as a goose, when the frame 10 is viewed from a profile with the upper portion of the shape being the vertical outline frame member 12. The frame 10 is constructed of a semi-flexible material, such as metal wire or plastic rod, which will maintain a certain shape.

When the decoy frame 10 is viewed from angles other than profile, the horizontal outline frame member 14 is seen to be the outer shape of a goose. The stabilizer frame member 16 is permanently joined to the vertical outline frame member 12 at point 18. Opposing ends of the stabilizer 16 are joined to the horizontal outline frame member 14 at two opposing points 20. The vertical outline frame member 12 is joined to the horizontal outline frame member 14 at one point 22 on the tip of the beak on the head area and joined at another point 24 at the tail of the body area.

Figure 4:
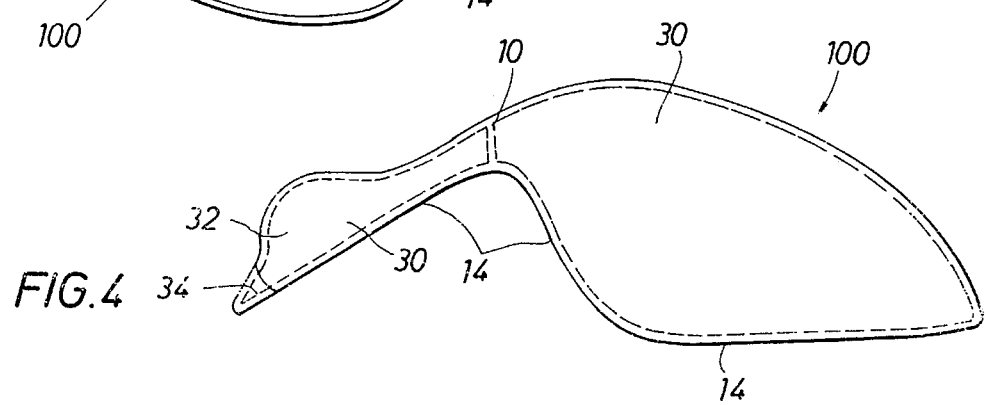
FIG. 4 is a side elevational view of the assembled bird decoy of FIG. 1 showing a flexible covering secured about the outside of the bird decoy frame, the frame being shown in dashed lines.

FIG. 4 shows a profile of the decoy frame 10 with a flexible covering 30 disposed about the outside of the frame 10. The flexible covering 30 is preferably a light-weight, substantially air-tight material such as plastic or cloth. Preferably, the flexible covering 30 is given eye 32 and beak 34 details on the head area. The flexible covering 30 is secured on the inside of the decoy frame 10 along the edge of the horizontal outline frame member 14.

With the flexible covering 30 and the frame 10 assembled, the bottom of the decoy's head, neck and body are open so that a plurality of decoys 100 may be stacked compactly together in assembled form. FIG. 5 shows a plurality of decoys 100 stacked in this manner.

The decoy 100 according to the first embodiment of the present invention is suitable for use in light to moderate winds without requiring any means of securing the decoy 100 to the ground.

FIG. 6 shows a decoy 200 having a head, neck and body assembled in accordance with the decoy 100 and which is supported above the ground 40 by a stake 44. The stake 44 is constructed of a semi-flexible material for the purpose of adding movement to the decoy 200. Preferably, the stake 44 is constructed of the same wire or rod as the decoy frame. When the decoy 200 is affected by wind, the decoy 200 moves in a manner that simulates the feeding and walking actions of a goose. Preferably, the stake 44 is detachably mounted to the decoy frame inside of the decoy 200.

FIG. 7 shows a decoy frame 50 of the third embodiment of the bird decoy 300 that is in a sentry or alert position. The decoy frame 50 is constructed in the same manner as the decoy frame 10 described in FIGS. 1–3.

FIG. 8 shows the decoy frame 50 with a flexible covering 52 disposed about the outside of the frame 50. The flexible covering 52 is secured on the inside of the frame 50 along a horizontal outline frame member 54. The decoy 300 in the sentry position is stackable and capable of being supported by a stake (not shown) as with the decoy 200 in the feeder position previously described.

Figure 9:
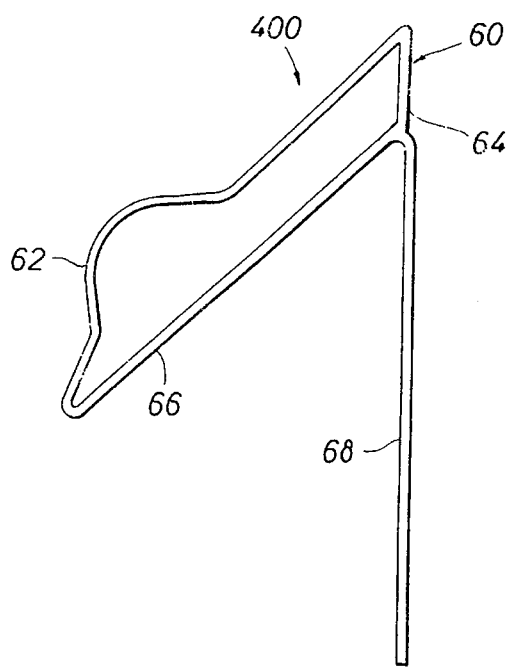
FIG. 9 is a side elevational view of a bird decoy frame according to a fourth embodiment of the present invention.
Figure 10:
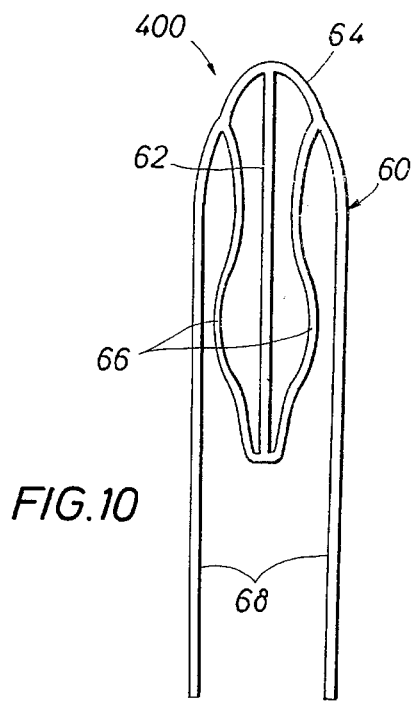
FIG. 10 is a front elevational view of the bird decoy frame of FIG. 9.

FIGS. 9 and 10 show a head and neck decoy frame 60 according to the fourth embodiment of the present invention. The head and neck frame 60 is of the same design and construction as the head and neck portion of the decoy frame 10 illustrated in FIGS. 1–3. Referring to FIGS. 9–12, the head and neck frame 60 shows the decoy 400 in the feeding position. Although not shown, it is to be understood that the head and neck frame 60 could alternatively be in the sentinel position. The horizontal outline frame member 66 of the frame 60 terminates downwardly at the rear of the neck behind a stabilizer frame member 64. The opposing sides of the horizontal outline frame member 66 that terminate downwardly, form two stake members 68. A vertical outline frame member 62 terminates at the stabilizer frame member 64 at the rear of the neck.

Figure 11:
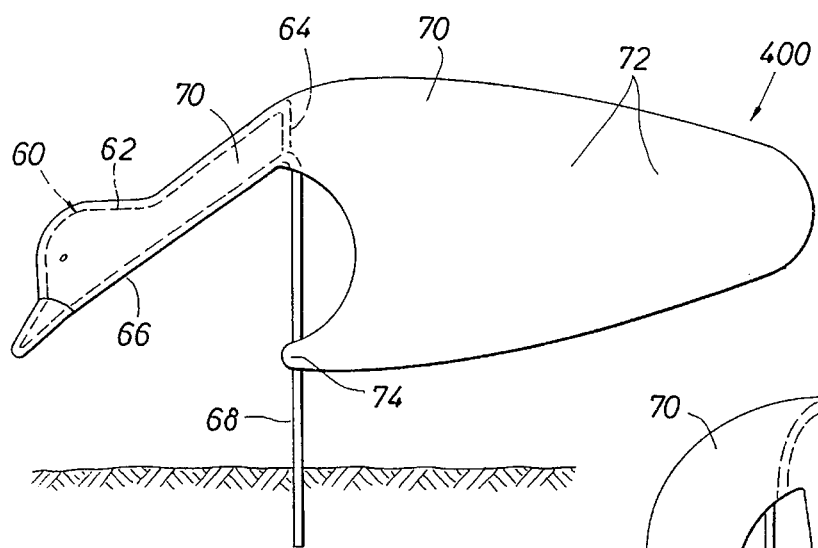
FIG. 11 is a side elevational view of the assembled bird decoy of FIG. 9 with the frame shown in dashed lines.
Figure 12:
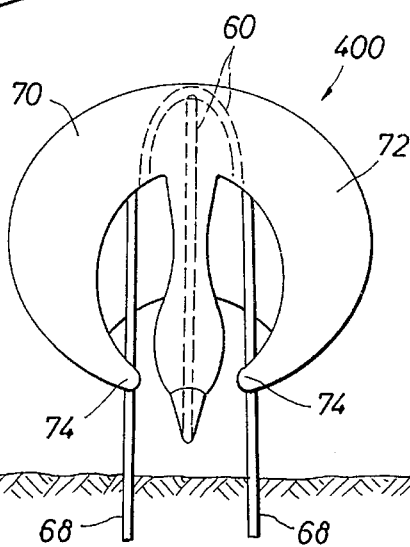
FIG. 12 is a front elevational view of the bird decoy of FIG. 11.

FIGS. 11 and 12 show the head and neck frame 60 with a flexible covering 70 disposed about the outside of frame 60 and a portion of the flexible covering 70 shaped to form a windsock-like body portion 72. The flexible covering 70 is preferably a light-weight, substantially air-tight material such as plastic or cloth. The covering 70 is secured along the outline horizontal outline frame member 66. A large portion of covering 70 is left to extend behind the rear of the frame 60. This portion of covering 70 is then formed as the body 72 of the decoy 400. The body 72 is of windsock construction. Two opposing portions of the body 72 are attached to the stake members 68 at opposing points 74 to maintain an opening in the body portion 72. The opening in the body portion 72 allows wind to enter and inflate the body portion 72. Wind sets the entire decoy 400 in motion. The flexibility of the stake members 68 allows for the head and neck to move in a manner which simulates the feeding or walking actions of a waterfowl such as a goose.

Because the head and neck of the decoy 400 are open on their bottom side, a plurality of such decoys 400 be stacked together compactly for transportation and storage purposes. The stackability of the decoys 400 allows the user to set a large number of decoys in the field in a minimal amount of time.

The foregoing disclosure and description of the invention is illustrative and explanatory thereof, and various changes in the size, shape, and materials, as well as in the details of illustrative construction and assembly, may be made without departing from the spirit of the invention.

I claim:

1. A fowl decoy comprising:
    a frame foraged of rod members, said frame forming a body portion, a neck portion and a head portion;
    a flexible covering disposed substantially around said frame and forming a lower opening in said body, neck and head portions of said frame to allow the fowl decoy to be stacked upon one another.

2. The fowl decoy of claim 1, wherein said neck and head portions are three-dimensional.

3. The fowl decoy of claim 1, further comprising a stake attached to said frame, said stake for supporting said frame elevated above the ground.

4. The fowl decoy of claim 3, wherein said stake is semi-flexible to allow said frame to move when wind blows against said frame in a manner that simulates the feeding or walking motion of the fowl to be attracted.

5. The fowl decoy of claim 2, wherein said head and neck portions are in a feeding position.

6. The fowl decoy of claim 2, wherein said head and neck portions are in a sentinel position.

7. The fowl decoy of claim 2, wherein said flexible covering is secured to said frame and the fowl decoy is allowed to be stacked upon one another without assembly or disassembly.

8. The fowl decoy of claim 1, wherein said frame comprises:
    a first rod forming a horizontal outline of said head, neck and body portions; and
    a second rod forming an upper vertical outline of said head, neck and body portions,
    wherein said first and second rods are joined at said head and body portions.

9. The fowl decoy of claim 8, wherein said frame further comprises a stabilizer frame member which is connected to said first and second rods.

10. A fowl decoy comprising:
    a frame formed of rod members, said frame forming a neck portion and a head portion;
    a flexible covering disposed substantially around said frame and forming a lower opening in said neck and head portions of said frame to allow the fowl decoy to be stacked upon one another.

11. The fowl decoy of claim 10, wherein said neck and head portions are three-dimensional.

12. The fowl decoy of claim 11, further comprising a stake attached to said frame, said stake for supporting said frame elevated above the ground.

13. The fowl decoy of claim 12, wherein said stake is semi-flexible to allow said frame to move when wind blows against said frame in a manner that simulates the feeding or walking motion of the fowl to be attracted.

14. The fowl decoy of claim 11, wherein said head and neck portions are in a feeding position.

15. The fowl decoy of claim 10, wherein said flexible covering is secured to said frame and the fowl decoy is allowed to be stacked upon one another without assembly or disassembly.

16. The fowl decoy of claim 10, wherein said frame comprises:
    a first rod forming a horizontal outline of said head and neck portions; and
    a second rod forming an upper vertical outline of said head and neck portions,
    wherein said first and second rods are joined at said head portion.

17. The fowl decoy of claim 16, wherein said frame further comprises a stabilizer frame member which is connected to said first and second rods.

18. The fowl decoy of claim 12, wherein said flexible covering includes a windsock body portion extending from said frame.

19. The fowl decoy of claim 18, further comprising a pair of stakes attached to said frame, said stakes for supporting said frame above the ground.

20. The fowl decoy of claim 19, wherein said windsock body portion is attached to said stake members to maintain an opening in said windsock body portion so that wind may inflate said windsock body portion.

* * * * *